Nov. 7, 1950     E. P. REESE     2,529,263
UNLOADING, CURING, STORING, AND RELOADING PLANT
Filed Sept. 8, 1945     7 Sheets-Sheet 3
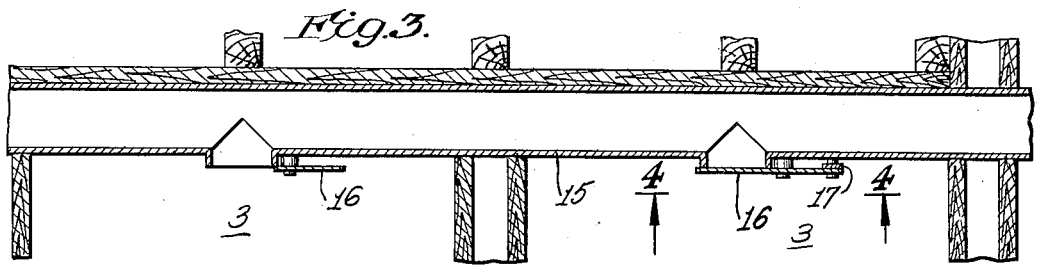
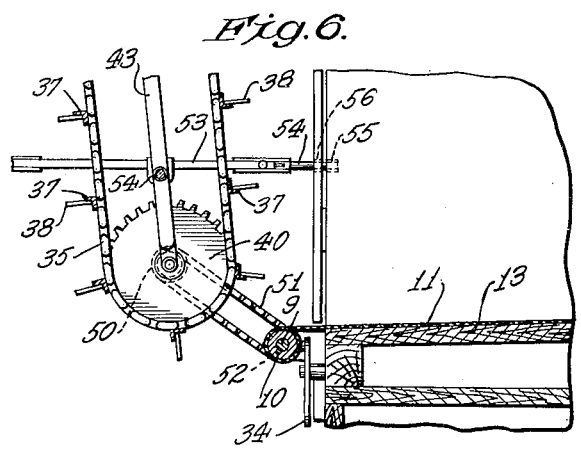
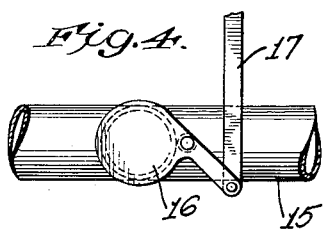
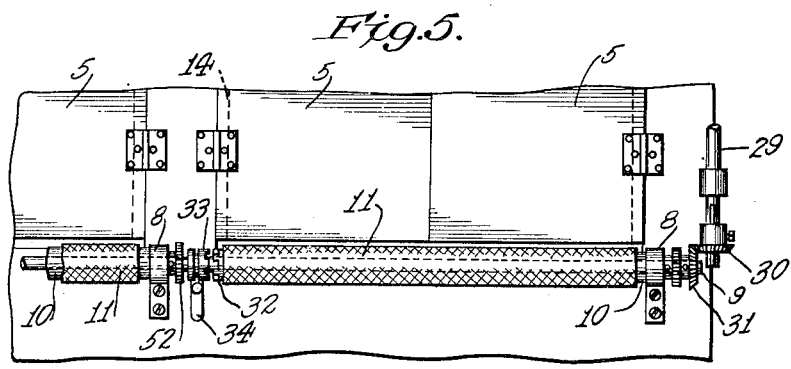
INVENTOR.
EMMET P. REESE
BY Hoguet, Neary & Campbell
his ATTORNEYS Nov. 7, 1950        E. P. REESE        2,529,263
UNLOADING, CURING, STORING, AND RELOADING PLANT
Filed Sept. 8, 1945        7 Sheets-Sheet 4

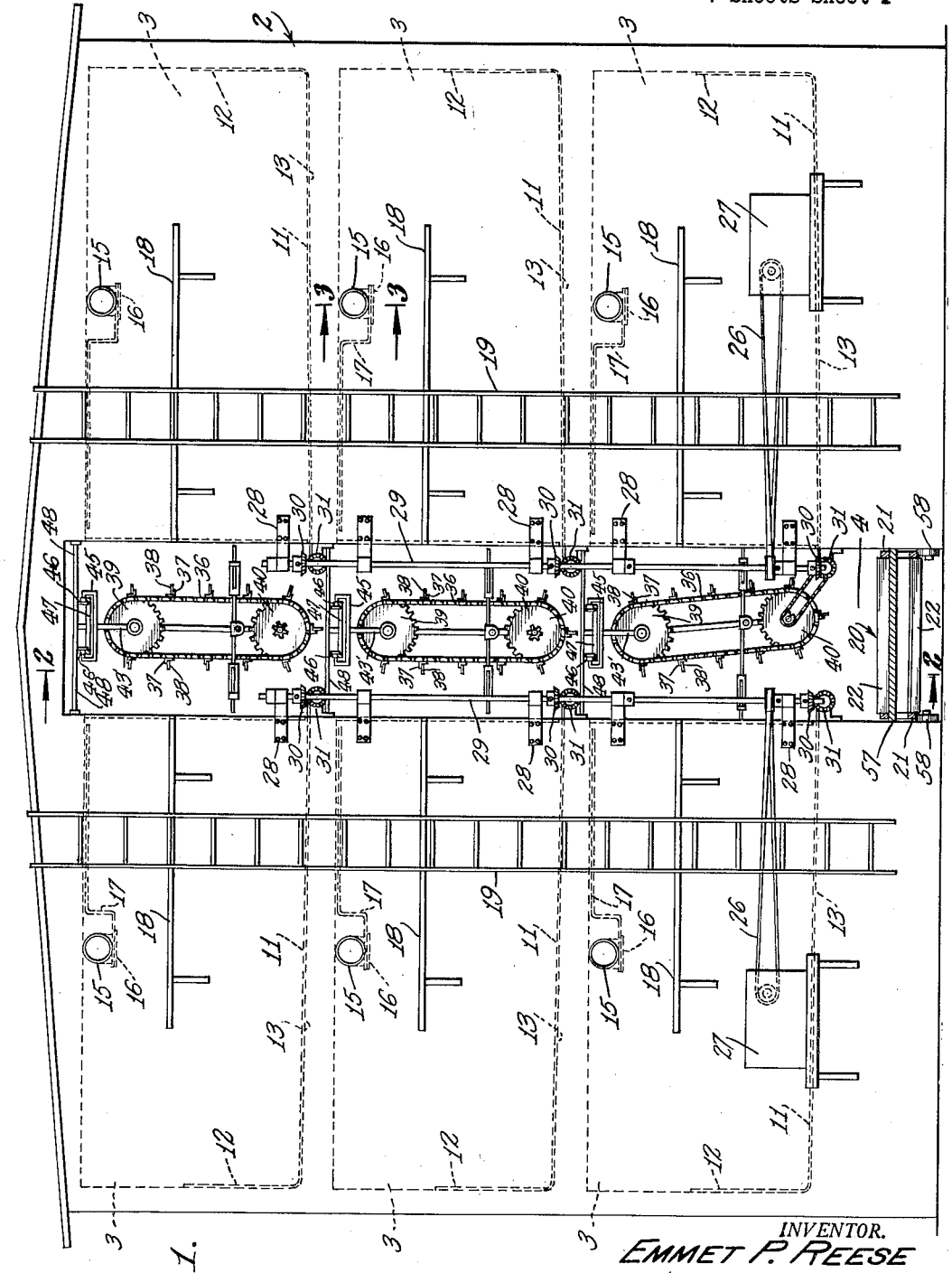

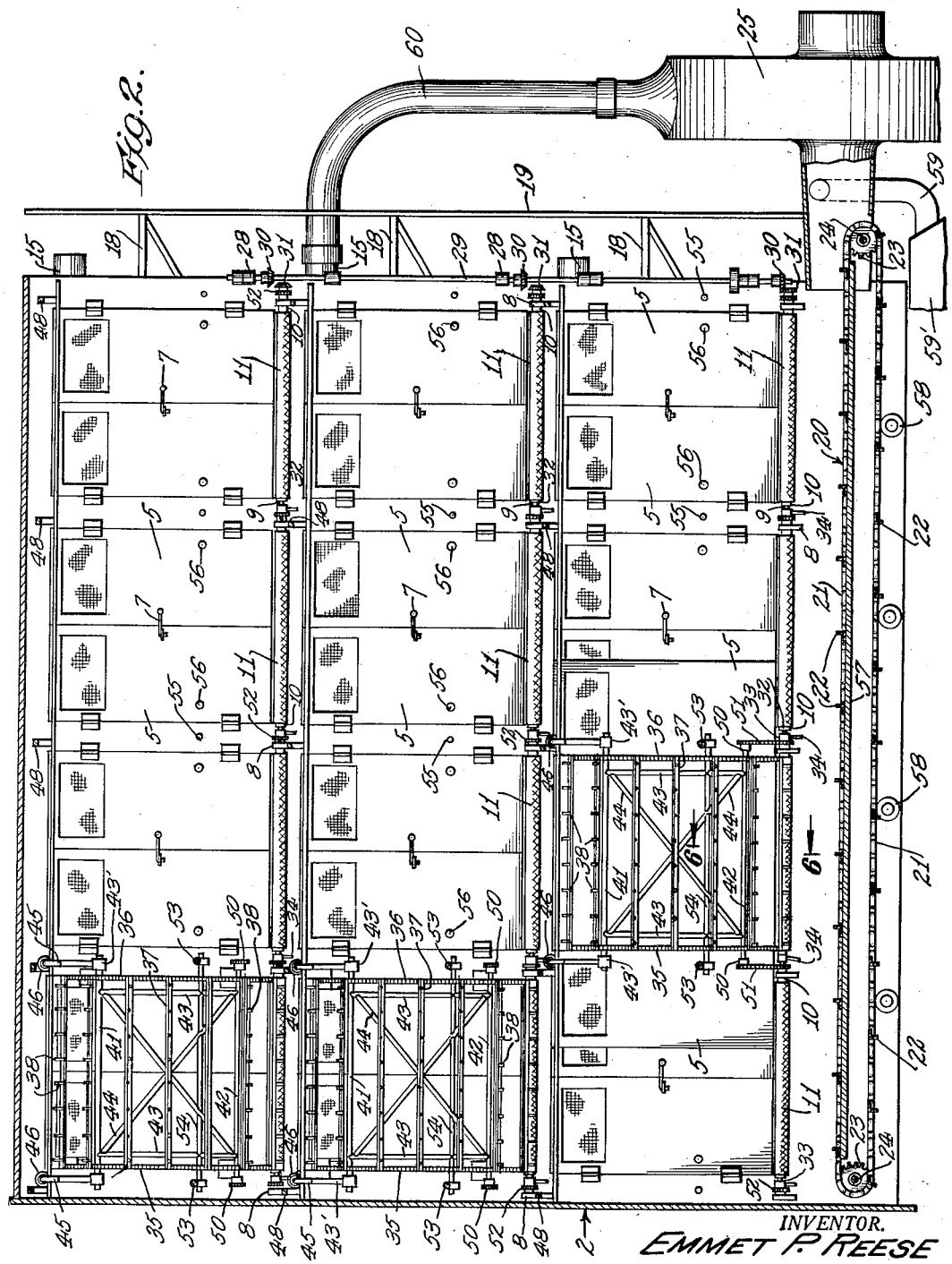

INVENTOR.
EMMET P. REESE
BY Hoguet, Neary & Campbell
his ATTORNEYS

Nov. 7, 1950         E. P. REESE         2,529,263

UNLOADING, CURING, STORING, AND RELOADING PLANT

Filed Sept. 8, 1945         7 Sheets-Sheet 7

INVENTOR.
EMMET P. REESE

Patented Nov. 7, 1950

2,529,263

UNITED STATES PATENT OFFICE 2,529,263

UNLOADING, CURING, STORING, AND RELOADING PLANT

Emmet P. Reese, Shoup, Idaho

Application September 8, 1945, Serial No. 615,204

4 Claims. (Cl. 241—101)

This invention relates to an unloading, curing, storing and reloading plant.

In my Patent No. 2,465,928, granted on March 29, 1949, I have disclosed a curing and storage plant as a small installation including two mows and means for curing material at least to some extent and delivering it into either of the mows and then for continuing the curing operation, if necessary, by withdrawing the material from either of the mows, passing it through the curing device, and then delivering it to the same mow or to the other mow.

One of the objects of this invention is the provision of a plant of this character including means for facilitating the unloading of the material and the delivery of the material to any one of a large number of mows which are preferably arranged in tiers on opposite sides of a center aisle.

Another object of the invention is the provision of a single carrier for receiving material withdrawn from any one of the mows and delivering it to a blower which may be a part of the curing mechanism and for then delivering the material into any other one of the plurality of mows or for delivering such material onto a wagon or truck.

Another object of the invention is the provision of a means whereby the material withdrawn from a wagon or truck and the material withdrawn from one of the mows is broken up before it enters the associated blower.

Another object of the invention is the provision of a mechanism whereby means for breaking up material withdrawn from any one of the mows on the same level in opposite tiers may be readily moved into position in front of the mow from which material is to be withdrawn and operatively connected to the associated operating shaft and held securely in such position.

Other objects of the invention will appear from the following description taken in connection with drawings in which, Figure 1 is an end elevational view of a building constituting the storage plant and provided with two opposed tiers of mows;

Figure 2 is a vertical section through the building on a line 2—2 of Figure 1;

Figure 3 is a vertical section on the line 3—3 of Figure 1;

Figure 4 is a view looking upwardly on the line 4—4 of Figure 3;

Figure 5 is an enlarged detail view of the lower right-hand corner of Figure 2;

Figure 6 is a vertical section on the line 6—6 of Figure 2;

Figure 7:
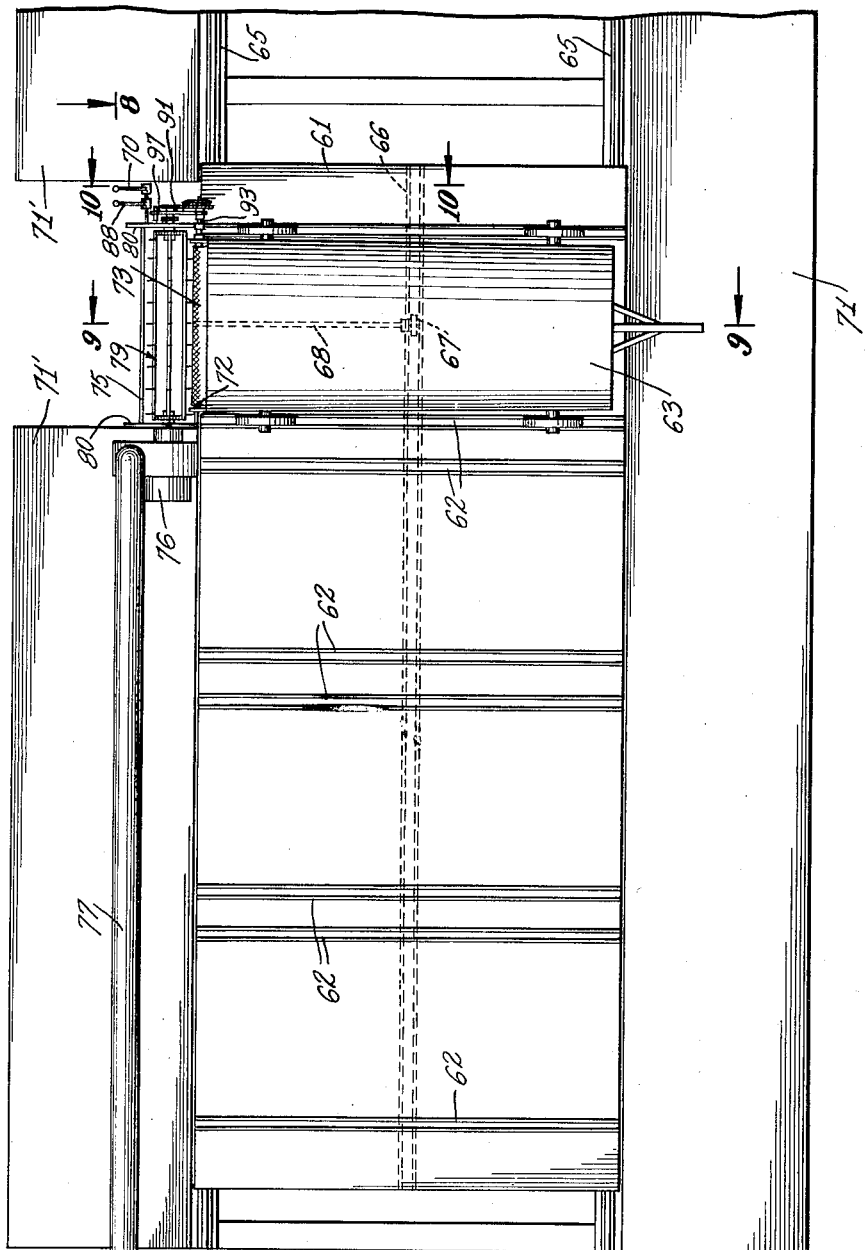
Figure 7 is a top plan view of the unloading platform and unloading and delivery mechanism.

In Figures 1 to 6 there is disclosed a building 2, which is provided with a large number of rooms or mows 3 which, as disclosed in Figure 1, are arranged in tiers one above the other on opposite sides of a center aisle 4. As shown in Figure 2, there may be four rooms on each floor. It is obvious, of course, that the number of floors may be increased or diminished and that the number of rooms on each floor may be increased or diminished in accordance with requirements.

As shown more particularly in Figure 2, the rooms or mows may be provided with doors 5 suitably hinged to the partitions between the rooms and to the end walls of the building, and these doors may be provided with ventilating screened sections, if desired, and suitable latching means may be provided as shown at 7 to hold the doors in closed position.

Suitably supported in brackets secured on the ends of the partitions and floors on each side of the aisle 4 are shafts 9, Figures 2, 5 and 6, which extend from one end of the building to the other and on which are rotatably supported drums 10, one for each room, to each of which is secured a canvas sheet 11 which extends over the floor of the room or mow and upwardly along the rear wall of the room as shown at 12, Figure 1.

As the drums are rotated by the shaft 9 by means later described, the material in the mow is pulled forwardly out of the door opening in the mow. To facilitate this movement of the canvas sheet 11 the floors of the rooms are preferably inclined forwardly as shown at 13, Figures 1 and 6, and the rooms or mows are wider at the front than at the rear as indicated at 14, Figure 5.

Suitably suspended from the ceiling and extending through each row of mows or rooms is a pipe 15, Figures 1, 2, 3 and 4, which is provided with a gate 16 in each room which, as shown in Figure 4, may be rocked into closed and open position by means of a rod 17 which may, if desired, extend into the aisle 4, so that the gate may be conveniently adjusted when other parts of the mechanism later described are set up or adjusted.

As will be described later, a suitable blower mechanism is provided for attachment to the pipes 15 for delivering material from a loaded wagon or truck to any of the mows or for delivering material that has been withdrawn from any of the rooms or mows into any other mow or into a wagon or truck. The mechanism by means of which wagons or trucks are unloaded and the material delivered to the rooms or mows will be described later.

For facilitating connection of a delivery hose and the like to the pipes 15 the end of the building may be provided with platforms 18 which may be reached by ladders 19.

It is contemplated within the object of this invention to remove the material from any one of the mows and deliver it to any other mow or mows or to deliver it to a wagon or truck. For this purpose the floor of the aisle is constituted by a movable carrier 20, Figure 2, which may comprise sprocket chains 21, see also Figure 1, connected by angle irons 22, which pass over sprocket wheels 23 on shafts 24 which may be driven by any suitable means, such as through clutch and speed control means from a source of power which may be utilized to drive a centrifugal blower 25 and also to drive the shafts 9 which drive the mechanism employed to withdraw material from the mows and to rake the material as it is withdrawn. The shafts 9 may be driven indirectly by belts 26 from suitable clutch and gear shift mechanisms 27 located at the end of the building as shown in Figure 1.

As shown in Figure 1, the various shafts and other mechanisms are duplicated on opposite sides of the aisle, and for the purpose of description those on the right-hand side will be referred to first.

Mounted on the face of the building are brackets 28 which are form bearings for a vertical shaft 29 driven by the belt 26. This shaft is provided with bevelled gears 30 which, as shown in Figure 5, are slidably keyed to the shaft and may be moved into and out of engagement with bevelled gears 31 on the drum shafts 9 before referred to and held in position by any suitable means as shown. By means of this construction any one or more of the drum shafts may be driven from the vertical shaft 29.

As stated before, the drums 10 are rotatably mounted on the shafts 9, and for the purpose of driving these drums selectively from this shaft one end of each drum is provided with a clutch disc 32, Figure 5, adapted to be engaged by a clutch disc 33 slidably and non-rotatably keyed on the shaft and adapted to be moved into and out of engagement with the clutch disc 32 by a lever 34, so that any one of the drums may be connected to the shaft 9 and the material removed from the corresponding room or mow.

In preparing for the removing of the material from any particular mow on any particular level the doors of the chosen mow are opened, and the appropriate drum 10 is connected to the shaft 9. It has, however, been found that material withdrawn and dropped onto the carrier 20 without prior treatment may reach the blower 25 in chunks and choke the blower. For this reason I have provided a rake mechanism, one for all of the rooms and mows on the same level on both sides of the aisle 4. This mechanism comprises a belted device which may comprise sprocket chains 35 and 36, Figures 1, 2 and 6, connected by angle irons 37 which carry spikes 38 which are adapted to break up the material as it is withdrawn from the mows. These sprocket chains 35 and 36 pass over upper and lower sprocket wheels 39 and 40 which are supported on the ends of crossbars 41 and 42 of a rectangular skeleton frame construction provided with side members 43 and diagonal members 44 as shown in Figure 2. The upper member 41 of the frame is extended and is rockably supported for transverse movement in bearings in hangers 43' which are attached to plates 45 provided with wheels or rollers 46 which run on tracks formed on plates 47 suspended from rods 48 supported in the brackets 8, before referred to. These tracks run along the entire length of the building thus permitting the rake devices to be moved from one end of the building into position in front of any desired room or mow on the same level and on opposite sides of the aisle. By means of the mechanism supporting the frames of the rakes the rakes may be rocked toward either side of the aisle into proper functional relationship with the drum of any particular mow or room on the same level so as to break up the material as it is advanced by the drum. One such position of the lower rake is shown in Figures 1, 2 and 6 in which the rake is in position to break up the material withdrawn from the third room or mow on the right-hand side of the aisle 4.

Each of the lowermost sprocket wheels 40 may be connected by a short sleeve to a small driving sprocket wheel 50 which is adapted to be connected by a readily removable or replaceable chain 51 to sprocket wheels 52 pinned to the drum shaft 9. For this purpose one of the links of the sprocket chain 51 may be readily removable and replaceable.

After the rake has been moved into this position and the sprocket chains 51 have been applied, the rake will be held in this position by means of stabilizer rods 53 each of which comprises a part pivotally supported on extensions of a cross element 54 of the rake frame. These stabilizer rods 53 comprise telescoping ends 54 which may be moved into and engaged with the bottoms of holes 55 in the partitions of the building structure and then locked on the rods 53, and to permit this when doors are opened, the doors are provided with holes 56 to receive the ends 54. These stabilizers prevent the rakes from rocking transversely of the aisle and also prevent them from moving longitudinally of the aisle out of registration with the particular drum with which they cooperate.

In order to support the carrier 20 against the force of the weight of material dropped on the carrier and the weight of material on the carrier, the upper course of the carrier is preferably supported by a plate 57, Figure 2. The lower course of the carrier may be supported on rollers 58 engaging the sprocket chains of the carrier. The carrier delivers the material into the mouth or funnel of the blower 25, and in order to dry the material, the air and the material are heated by hot air delivered to the funnel through a pipe 59, Figure 2, from any suitable heater 59'. The centrifugal blower delivers the mixture of air and material through a delivery pipe 60 which may be a flexible hose, and which may be of sufficient length to reach to any one of the pipes 15 shown in Figure 1, and, if desired, this delivery pipe may be connected to or directed into a wagon or truck on the unloading platform about to be described.

In order to facilitate unloading of the material I have provided the mechanism described in Figures 7 to 11. This includes a platform 61 of elongated rectangular form provided with a plurality of tracks 62, Figure 7, extending transversely thereof, which are of channel shape to receive the wheels of wagons or trucks 63 as shown more particularly in Figures 7, 9 and 10. The platform 61 is preferably supported at its sides on rollers 64 which run on rails 65 so that wagons or trucks carried thereby may be moved into the unloading position as indicated more particularly in Figure 7. Secured centrally on the bottom of the platform 61 and extending lengthwise thereof is a bar 66 provided with cogs with which mesh the cogs of a wheel 67 carried by a shaft 68 which may be driven through gears 69 from a driving mechanism under the control of a lever 70, Figure 10, through a mechanism which permits the platform to be moved either to the right or left, Figure 7, in order to move any one of the wagons or trucks into the unloading position or the unloaded wagon or truck into a position where it may be run off from the platform over either of the ramps 71 or 71'.

Figure 9:
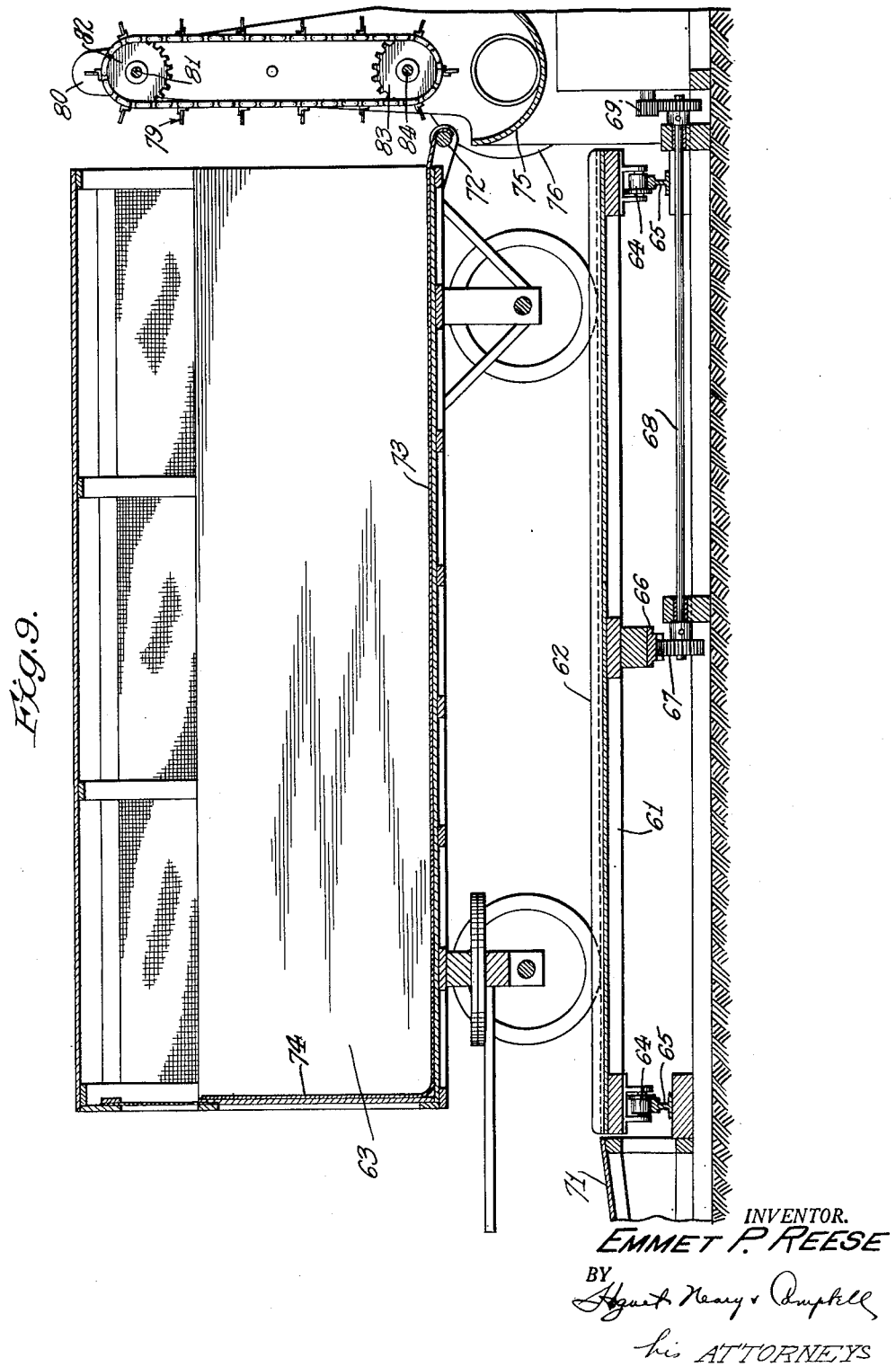
Figure 9 is a vertical transverse section on the line 9—9 of Figure 7.
Figure 10:
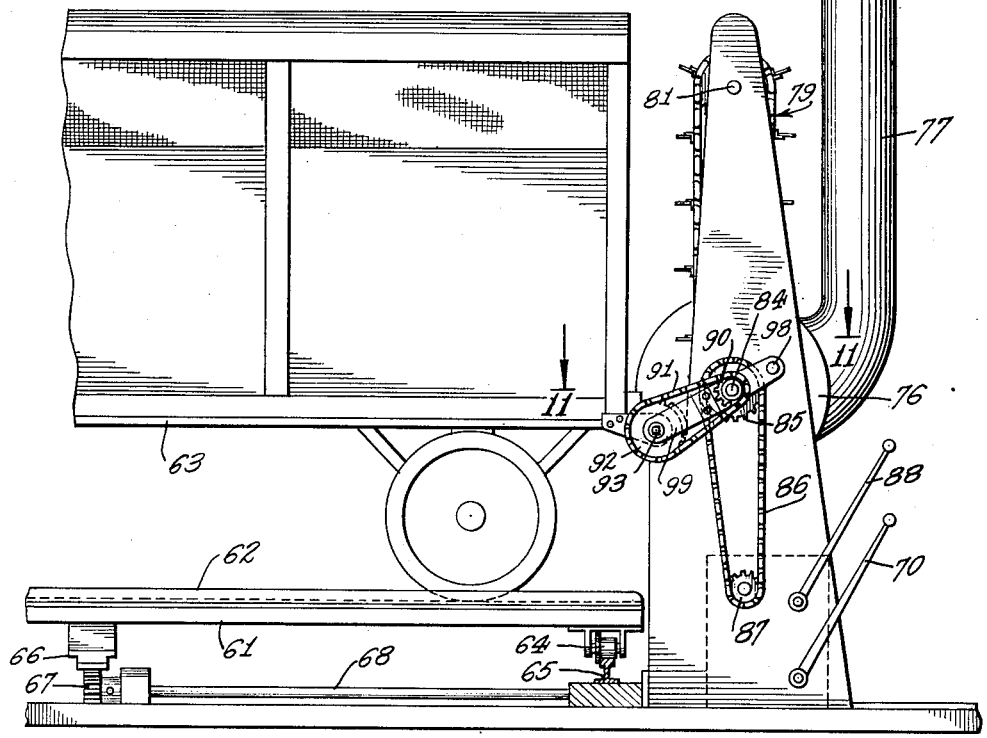
Figure 10 is a side elevation on the line 10—10 of Figure 7.
Figure 11:
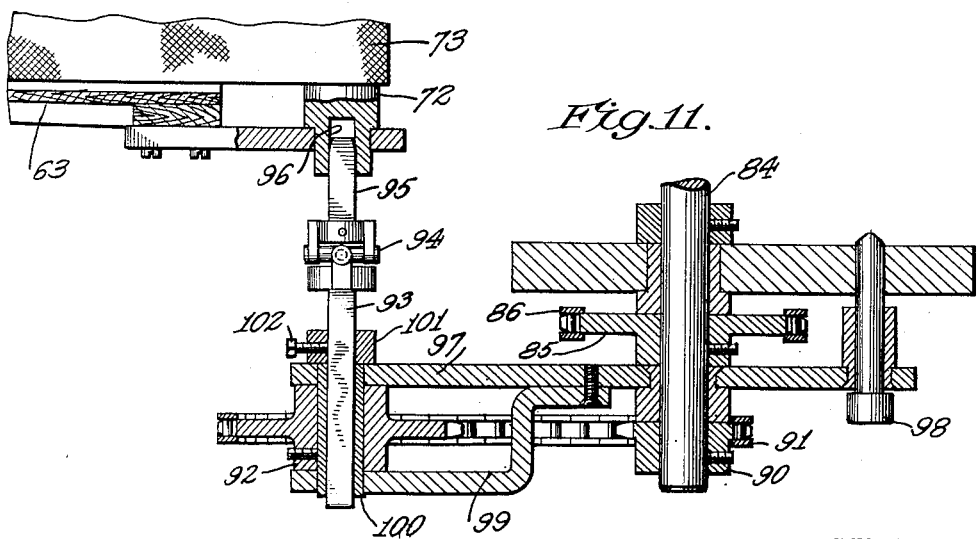
Figure 11 is a detail in horizontal section on the line 11—11 of Figure 10.

Mounted on the rear end of the wagon or truck, as shown in Figure 9, is a drum 72 on which is adapted to be wound a canvas sheet 73 which lies on the floor of the truck and which has its forward end 74 extending upwardly along the front end of the body of the truck for the same purpose as in the mows in the building.

As more particularly shown in Figure 7, the rear end of the inside of the body of the truck is preferably made wider than the front end, so that the material may be more readily pulled out of the truck by means of the canvas sheet 73.

Figure 8:
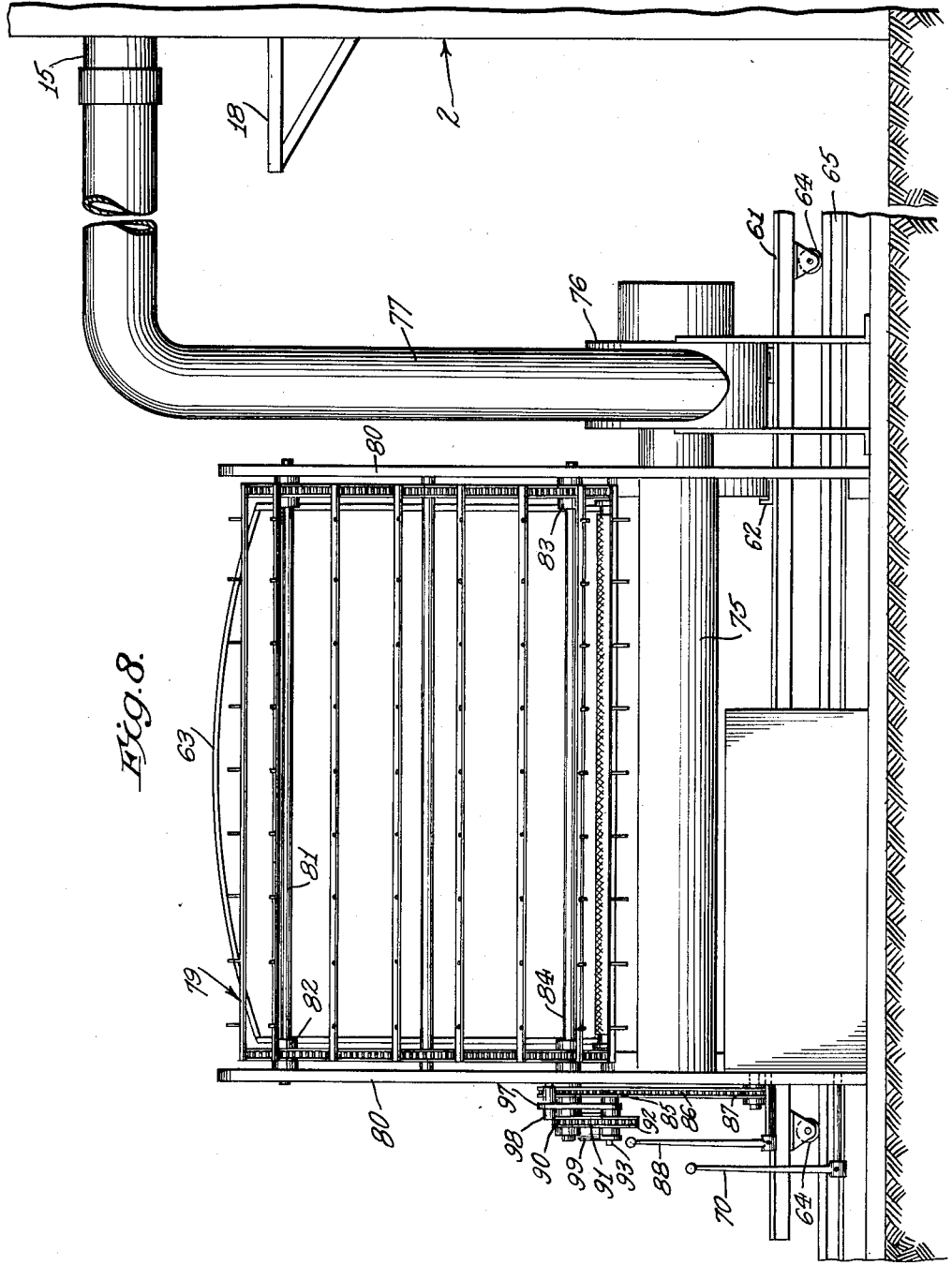
Fig. 8 is a vertical elevation on the line 8—8 of Figure 7.

The material is delivered from the truck into a trough-like mouth 75, Figures 8 and 9, of a centrifugal blower 76 which is provided with a delivery hose 77 which is adapted to be connected with any one of the pipes 15 in the storage building or directed onto a wagon or truck.

In order to break up the material before it enters the mouth of the blower, a rake indicated generally at 79 and of the same general construction as the rake used in the building hereinbefore described is provided. The rake is shown as supported on standards 80. The standards 80 support a rod 81 on which upper sprocket wheels 82 are supported and a shaft 84 to which the lower sprocket wheels 83 are secured. One end of the shaft 84 extends to the exterior of the side member 80 and is provided with a sprocket wheel 85 connected by a sprocket chain 86 to a driving sprocket wheel 87 which is adapted to be connected to a suitable driving mechanism for driving the same at different speeds by means of a lever 88.

In order to drive the drum 72 the shaft 84 is provided with a sprocket wheel 90 over which passes a sprocket chain 91 for driving the sprocket wheel 92 on a square shaft 93 connected by a universal joint 94 to a squared stub shaft 95 which is adapted to be engaged in a recess 96 in the end of the drum 72. The shaft 93 is supported in a jack member 97 rockably supported on the shaft 84 and adapted to be held in horizontal alignment with the drum 72 by means of a locking pin 98. The jack member 97 includes a plate 99 offset so as to receive the sprocket wheel 92 which is supported on a bearing sleeve 100 extending through openings in the jack member 97 and the offset portion 99. The sleeve 100 is provided with a rectangular axial bore in which the shaft 93 may be slid lengthwise so as to move the stub shaft 95 into and out of the recess 96 in the end of the drum 72. For the purpose of holding the stub shaft 95 within the recess 96 a locking disc 101 may be provided which may be fastened to the shaft 93 by means of a set screw 102.

The mechanism and installation shown and described facilitate the unloading, storing, curing and reloading of material. The material may be unloaded and delivered into one or more mows on the same level on one side of the aisle. The uncured or partly-cured material stored in one or more mows other than the one into which uncured material is delivered, may be cured and delivered into one or more mows in other tiers than the one occupied by the mow into which the uncured material is delivered. In case no uncured material is being stored, the material in one or more mows of different tiers may be cured and delivered to other mows in the same tier or any mows in a different tier. The arrangement of the mows on opposite sides of an aisle facilitates the use of one rake for any of the mows on the same level. Use of a drum and canvas sheet is made practical by the shapes of the body of the wagon or truck and the mows. The rakes used with the wagon or truck and in the building break up the material to cause it to be cured evenly and to prevent injury to the blowers. The speed of unloading a number of waiting wagons or trucks is greatly increased by the provision of the traveling platform.

While I have illustrated and described a preferred embodiment of my invention, it is to be understood that I reserve the right to all such changes as fall within the principles of this invention and the scope of the appended claims.

I claim:

1. In a curing plant, the combination of oppositely arranged compartments, raking means interposed between said compartments, means for pivotally supporting the upper end of said raking means permitting movement of the lower end of said raking means into operative relation with either of said compartments and a stabilizer pivotally supported on said raking means and comprising telescoping ends adapted to be moved into contact with the walls of said compartments for holding said raking means in operative relation with either of said compartments.

2. In a storage installation comprising means forming a plurality of storage compartments arranged in vertical and horizontal rows, separate means in each compartment for withdrawing material from said compartments, means to operate the withdrawing means selectively, mechanism having movable elements for raking the material as it is being withdrawn from a compartment, means supporting said mechanism for movement horizontally to position it in front of any of said compartments from which material is being withdrawn, means for drivingly connecting said operating means to said movable elements of said raking mechanism in any of its positions in association with any of its said compartments, and a conveyor located below said raking means in any of its positions for receiving material withdrawn from any one of said compartments.

3. A storage and distributing installation comprising a plurality of storage chambers arranged in a plurality of vertical and horizontal rows, said chambers having discharge openings at their fronts all facing in the same direction, separate means in each of said chambers for discharging material selectively from said chambers, a track extending substantially horizontally above and in front of said chambers, a raking mechanism including movable raking elements suspended from and movable along said track into position in front of any chamber from which material is being discharged, means for driving said raking elements and actuating said discharging means selectively, a conveyor below said raking mechanism for receiving material discharged from said chambers, and means including a blower for receiving material from said conveyor and selectively delivering it to any of said chambers.

4. A storage and distributing installation comprising a plurality of storage chambers arranged in a plurality of vertical and horizontal rows, said chambers having discharge openings at their fronts all facing in the same direction, separate means in each of said chambers for discharging material selectively from said chambers, a track extending substantially horizontally above and in front of said chambers, a raking mechanism including movable raking elements suspended from and movable along said track into position in front of any chamber from which material is being discharged, means for driving said raking elements and actuating said discharging means selectively, a conveyor below said raking mechanism for receiving material discharged from said chambers, and means including a blower for selectively delivering material to any of said chambers.

EMMET P. REESE.

REFERENCES CITED

The following references are of record in the file of this patent:

UNITED STATES PATENTS

| Number | Name | Date |
|---|---|---|
| 224,002 | Doane | Feb. 3, 1880 |
| 274,439 | Clark | Mar. 20, 1883 |
| 276,504 | Thomas | Apr. 24, 1883 |
| 571,019 | Roberts | Nov. 10, 1896 |
| 583,408 | Mallon | May 25, 1897 |
| 887,693 | Richmond | May 12, 1908 |
| 934,918 | Irven et al. | Sept. 21, 1909 |
| 949,055 | Beskow | Feb. 15, 1910 |
| 1,104,738 | Schuman | July 21, 1914 |
| 1,342,418 | Brahtz | June 8, 1920 |
| 2,078,379 | Grayson | Apr. 27, 1937 |
| 2,274,314 | Whaley | Feb. 24, 1942 |
| 2,342,528 | Carbaugh | Feb. 22, 1944 |
| 2,353,948 | Swift | July 18, 1944 |

Certificate of Correction

Patent No. 2,529,263                                              November 7, 1950

EMMET P. REESE

It is hereby certified that error appears in the printed specification of the above numbered patent requiring correction as follows:

Column 3, line 39, after "which" strike out "are"; column 8, list of references cited, under the heading "UNITED STATES PATENTS" add the following:

2,388,399      Forster et al. _____ Nov. 6, 1945 and that the said Letters Patent should be read as corrected above, so that the same may conform to the record of the case in the Patent Office.

Signed and sealed this 23rd day of January, A. D. 1951.

[SEAL]

THOMAS F. MURPHY,
                                                          *Assistant Commissioner of Patents.*